(No Model.)
J. C. RUNDLETT.
EGG RACK AND HOLDER.
No. 262,834. Patented Aug. 15, 1882.
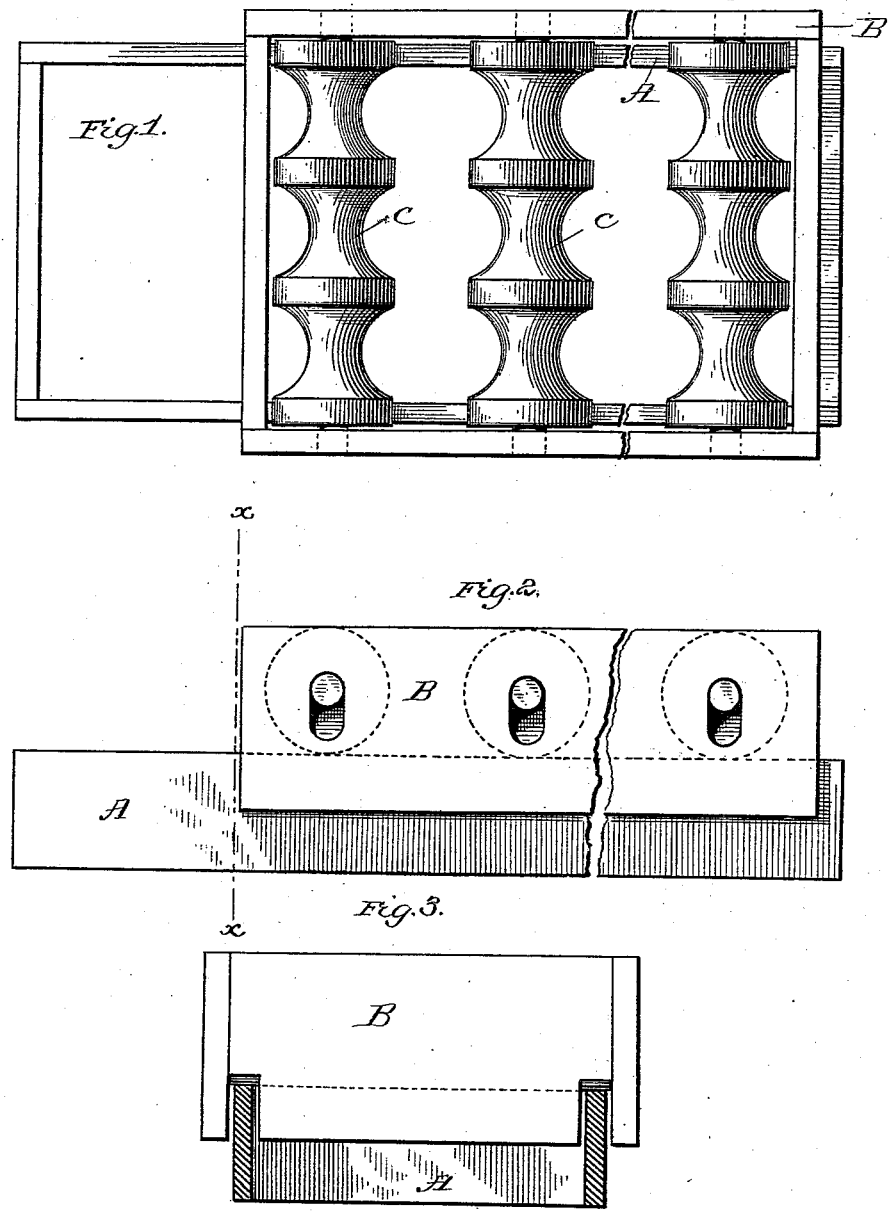

UNITED STATES PATENT OFFICE.

JAMES C. RUNDLETT, OF CAPE ELIZABETH, MAINE.

EGG RACK AND HOLDER.

SPECIFICATION forming part of Letters Patent No. 262,834, dated August 15, 1882.

Application filed June 26, 1882. (No model.)

*To all whom it may concern:*

Be it known that I, JAMES C. RUNDLETT, of Cape Elizabeth, in the county of Cumberland and State of Maine, have invented a new and useful Improvement in Egg Racks and Holders; and I do hereby declare that the following is a full, clear, and exact description of the same.

My invention relates to an improvement on racks or boxes for holding and preserving eggs.

The invention is based upon the well-known fact that eggs, if kept upright on either end and frequently turned over, so as to prevent the yelk from adhering to the shell, will remain fresh for a longer period than if permitted to rest constantly in one position.

Heretofore where a large number of eggs have been contained in a rack or box it has been usual to change their position by turning each egg separately by hand, and the time and labor required to turn many dozen eggs in this manner have prevented this natural method of preservation from being generally used.

My invention consists mainly in providing improved means whereby a large number of eggs may be kept on end and simultaneously turned. Further, in providing a sliding egg-holder having rollers running on a bed-plate or track, by means of which the eggs are held stationary and turned simultaneously; and, further, in the construction of the egg-rack and its various parts, all as fully hereinafter described.

In the drawings, Figure 1 is a top view. Fig. 2 is a side view. Fig. 3 is a cross-section on line $x\ x$, Fig. 2.

A represents the bed-frame of the rack. It is of wood, and composed of two side and two end strips secured together by nails or otherwise. The dimensions of this bed-frame may be varied to any extent; but in practice I have found that for a rack to contain fifty dozen eggs the frame should be about eight feet long, two and one-half feet wide, and two or three inches high.

B is the upper movable frame, which is shorter and wider than the frame A, and is composed of side and end pieces secured together, as shown. Each of the end pieces is slotted, so that the upper frame fits over the lower, and is guided in its movement thereby. The bed-frame A should be from two to three inches longer than the sliding frame B, so as to permit motion of the latter to that extent.

Within the frame B are journaled rollers C C, which are preferably grooved, as shown in Fig. 1, the flanges between the grooves being approximately half an inch in thickness. The outside flanges of each roller rest upon the side strips of the frame A, so that the frame B is supported by such rollers and slides easily from end to end of frame A. The rollers are placed a sufficient distance apart to receive an egg endwise within the grooves of two adjoining rollers, and to support such egg in a stationary position until the upper frame is moved. The rollers are journaled preferably in elongated slots in the side pieces of the frame B, so as to permit all the rollers to bear on the bed-frame should this frame sag in the middle or elsewhere.

In the operation of the device the frame B is pushed to one end of frame A and the interstices between the rollers filled with eggs placed with either end upward. Supposing the rack to have a capacity for fifty dozen, by pushing the frame B to the other end of frame A all the eggs will be inverted by the rotation of the rollers, sufficient movement being permitted to just accomplish that object. This operation can be repeated as often as desired, resulting in a much better preservation of the eggs.

Although I prefer to groove the rollers, as shown, (and they can be easily and cheaply turned to the desired form,) smooth rolls may be used, in which case the eggs would rest on their sides, and the capacity of the rack would be somewhat diminished, as well as the length of time the eggs would keep fresh, as eggs keep fresh much longer on their ends than when upon their sides.

I am aware that egg-boxes mounted on trunnions for the purpose of turning such boxes, so as to change the position of the eggs contained therein, are not new; and I am also aware that a reciprocating grid has been used in connection with an egg-holding apron for giving a certain amount of movement to such eggs, and I desire to disclaim these inventions.

What I claim is—

1. The combination of the stationary bed-frame, the movable frame, and a series of rollers carried by the movable frame, adapted to hold the eggs, substantially as set forth.

2. The combination of the bed-frame, the movable frame having slotted end and side pieces, and a series of grooved rollers having flanges adapted to run upon the upper edge of the bed-frame, substantially as described.

In testimony whereof I have signed my name to this specification in the presence of two subscribing witnesses.

JAMES C. RUNDLETT.

Witnesses:
FRANCIS FESSENDEN,
AUGUSTUS CUMMINGS.